(12) United States Patent
Dezheng et al.

(10) Patent No.: US 8,181,973 B2
(45) Date of Patent: May 22, 2012

(54) CLAMPING APPARATUS FOR A RECIPROCATING TOOL

(75) Inventors: Zheng Dezheng, Jiangxi (CN); Timothy P. Michel, Naperville, IL (US); Harald Krondorfer, Mundelein, IL (US)

(73) Assignee: Robert Bosch GmbH, Stuttgart (DE)

( * ) Notice: Subject to any disclaimer, the term of this patent is extended or adjusted under 35 U.S.C. 154(b) by 1021 days.

(21) Appl. No.: 12/151,176

(22) Filed: May 5, 2008

(65) Prior Publication Data
US 2009/0273146 A1 Nov. 5, 2009

(51) Int. Cl.
B23B 31/107 (2006.01)

(52) U.S. Cl. .................... 279/71; 279/81; 279/76

(58) Field of Classification Search ............. 279/71, 279/76, 78–81
See application file for complete search history.

(56) References Cited

U.S. PATENT DOCUMENTS

| | | | |
|---|---|---|---|
| 3,583,716 A * | 6/1971 | Daniel, Jr. ............. | 279/81 |
| 3,823,473 A * | 7/1974 | Hoffman ............... | 30/338 |
| 4,020,555 A * | 5/1977 | Hedrick ................ | 30/392 |
| 4,502,824 A * | 3/1985 | Dohse et al. ........... | 409/234 |
| 5,566,595 A * | 10/1996 | Goff .................. | 81/177.85 |
| 6,209,208 B1 * | 4/2001 | Marinkovich et al. ..... | 30/392 |
| 6,612,039 B2 * | 9/2003 | Kakiuchi et al. ........ | 30/392 |
| 6,725,548 B1 * | 4/2004 | Kramer et al. .......... | 30/392 |
| 6,851,194 B1 * | 2/2005 | Chen et al. ............ | 30/392 |
| 6,863,280 B2 * | 3/2005 | Chiu .................. | 279/82 |
| 7,040,023 B2 | 5/2006 | Nemazi et al. | |
| 7,251,897 B2 | 8/2007 | Shuhua | |
| 2004/0035010 A1 | 2/2004 | Kakiuchi et al. | |
| 2004/0194324 A1 | 10/2004 | Youn-Chyuan | |
| 2005/0156390 A1 * | 7/2005 | Marini et al. .......... | 279/74 |

* cited by examiner

*Primary Examiner* — Eric A Gates
*Assistant Examiner* — Bayan Salone
(74) *Attorney, Agent, or Firm* — Greer, Burns & Crain, Ltd.

(57) ABSTRACT

Embodiments are disclosed for a tool-less clamping apparatus for a reciprocating tool having a reciprocating spindle having a center axis and at least one radially oriented aperture and a receiving slot at its forward end for receiving a tool accessory, the apparatus having an unclamped position and a clamped position, and comprising a hollow generally cylindrical sleeve secured to the spindle, a hollow generally cylindrical collar configured to fit on the sleeve and being rotatable relative to the spindle and the sleeve, the collar having an inner cam surface that increases in radius from the axis through a first predetermined circumferential arc in a first direction, a spring operatively connected to provide a biasing force to the collar toward its clamped position, and a detent pin positioned in the spindle aperture and configured to engage a hole in the tool accessory and thereby firmly hold the tool accessory in the apparatus when urged into contact with the tool accessory.

21 Claims, 5 Drawing Sheets

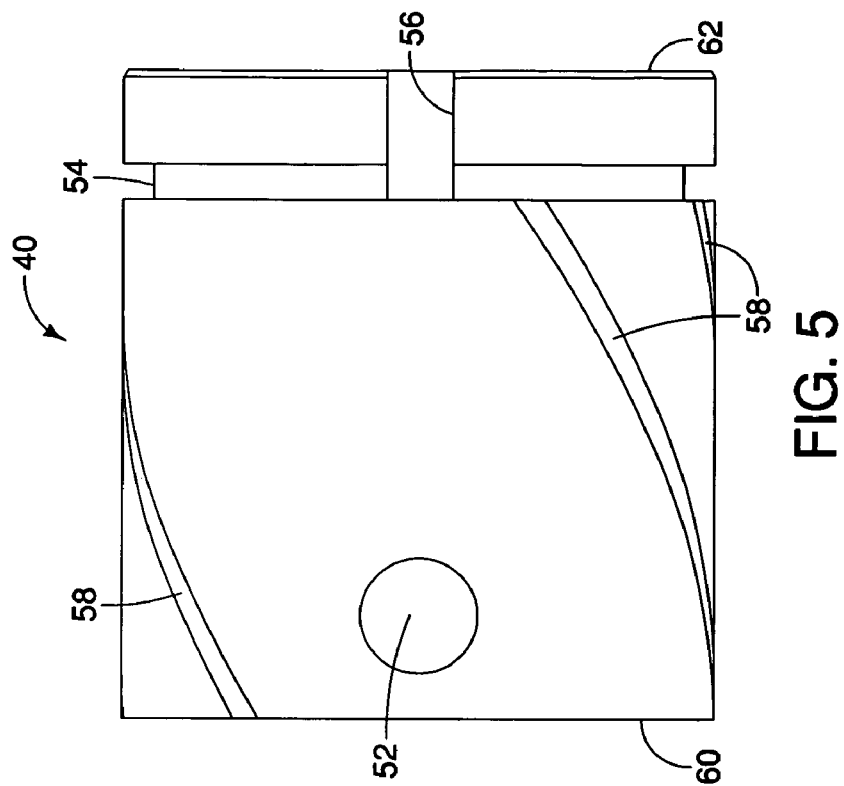
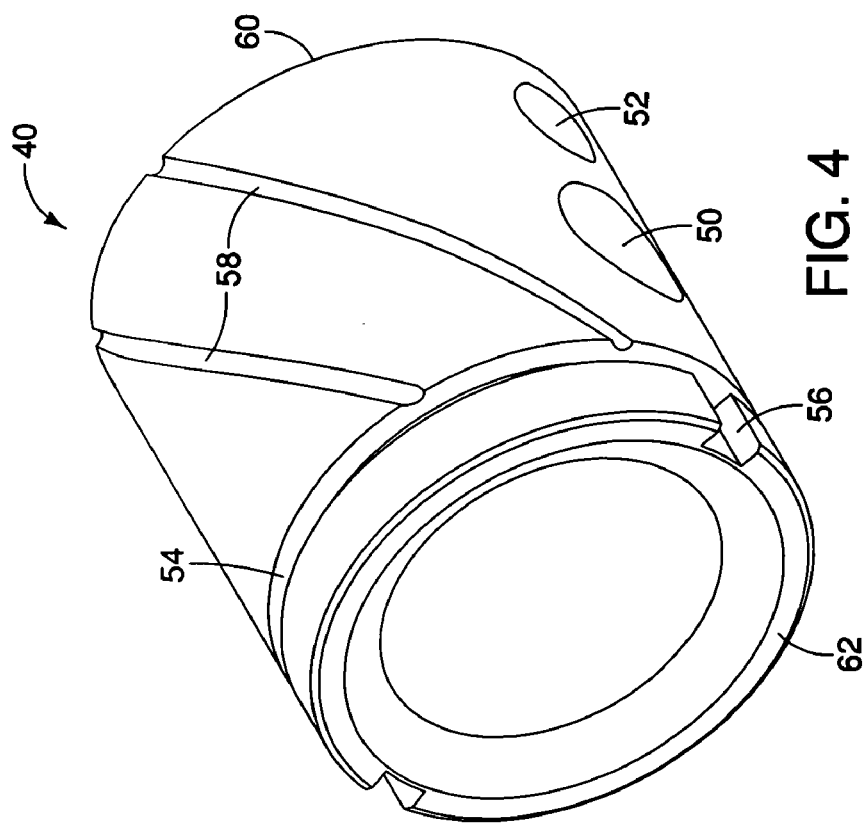

CLAMPING APPARATUS FOR A RECIPROCATING TOOL

BACKGROUND OF THE INVENTION

The present invention generally relates to tools, and more particularly, to mechanisms for clamping tool accessories to such tools.

Reciprocating tools such as jigsaws, saber saws and the like have been the subject of extensive research and development efforts over the years. A focus of many designers is the mechanisms for attaching a tool attachment such as a cutting blade, a saw blade, an abrasive, polishing or smoothing member or the like to the reciprocating portion of such tools.

Early attachment mechanisms required separate tools of one kind or another, typically screwdrivers, wrenches or levers, to attach the tool attachment to a reciprocating member by tightening screws or the like. Because special tools were often required, it was necessary to have such tools available during use in the event the tool attachment breaks or otherwise needs to be changed because it is worn out or a different type of tool attachment is needed.

Recently, there has been a concerted effort to develop new kinds of attachment or clamping mechanisms that do not require the use of tools to mount and remove tool attachments from the tool. While mechanisms are known in the prior art that have this capability, the various known designs have varying degrees of effectiveness in securely holding the tool attachment in the tool, or in the ease and convenience of operation in mounting or removing tool attachments from the tool or in the degree of complexity and therefore cost of manufacture. Known mechanisms often do not exhibit reliable operation in construction, demolition, metal cutting, and similar types of work that produce considerable amounts of particulate matter, such as drywall dust and demolition dust.

SUMMARY OF THE INVENTION

The preferred embodiment discloses a clamping apparatus for a reciprocating tool having a reciprocating spindle having a center axis and at least one radially oriented aperture and a receiving slot at its forward end for receiving a tool accessory that has a shank portion with a hole at one end and a working portion, the shank being configured to be inserted in the slot, the apparatus being configured to be attached to the spindle, the apparatus having an unclamped position and a clamped position, and comprises:

a hollow generally cylindrical sleeve secured to the spindle, the sleeve having a radial aperture aligned with the spindle aperture and an annular recess oriented in a plane perpendicular to the center axis and extending around a substantial portion of the outside surface near the forward end, a hollow generally cylindrical collar configured to fit on the sleeve and being rotatable relative to the spindle and the sleeve, the collar having an inner cam surface that increases in radius from the axis through a first predetermined circumferential arc in a first direction, a spring operatively connected to provide a biasing force to the collar in a second direction opposite the first direction, and a detent pin positioned in the spindle aperture and configured to engage the hole in the tool accessory and thereby firmly hold the tool accessory in the apparatus when urged into contact with the tool accessory, the collar being biased by the spring to rotate the collar to its clamped position when the tool accessory is inserted in the slot, the rotation causing the cam surface to engage the detent pin and move it into the hole in the tool accessory and firmly hold the tool accessory in the apparatus.

DESCRIPTION OF THE DRAWINGS

FIG. 4 is a perspective view of the sleeve of the apparatus shown in FIG. 1;

FIG. 5 is a side view of the sleeve of the apparatus shown in FIGS. 1 and 4;

DESCRIPTION OF THE PREFERRED EMBODIMENTS

Figure 1:
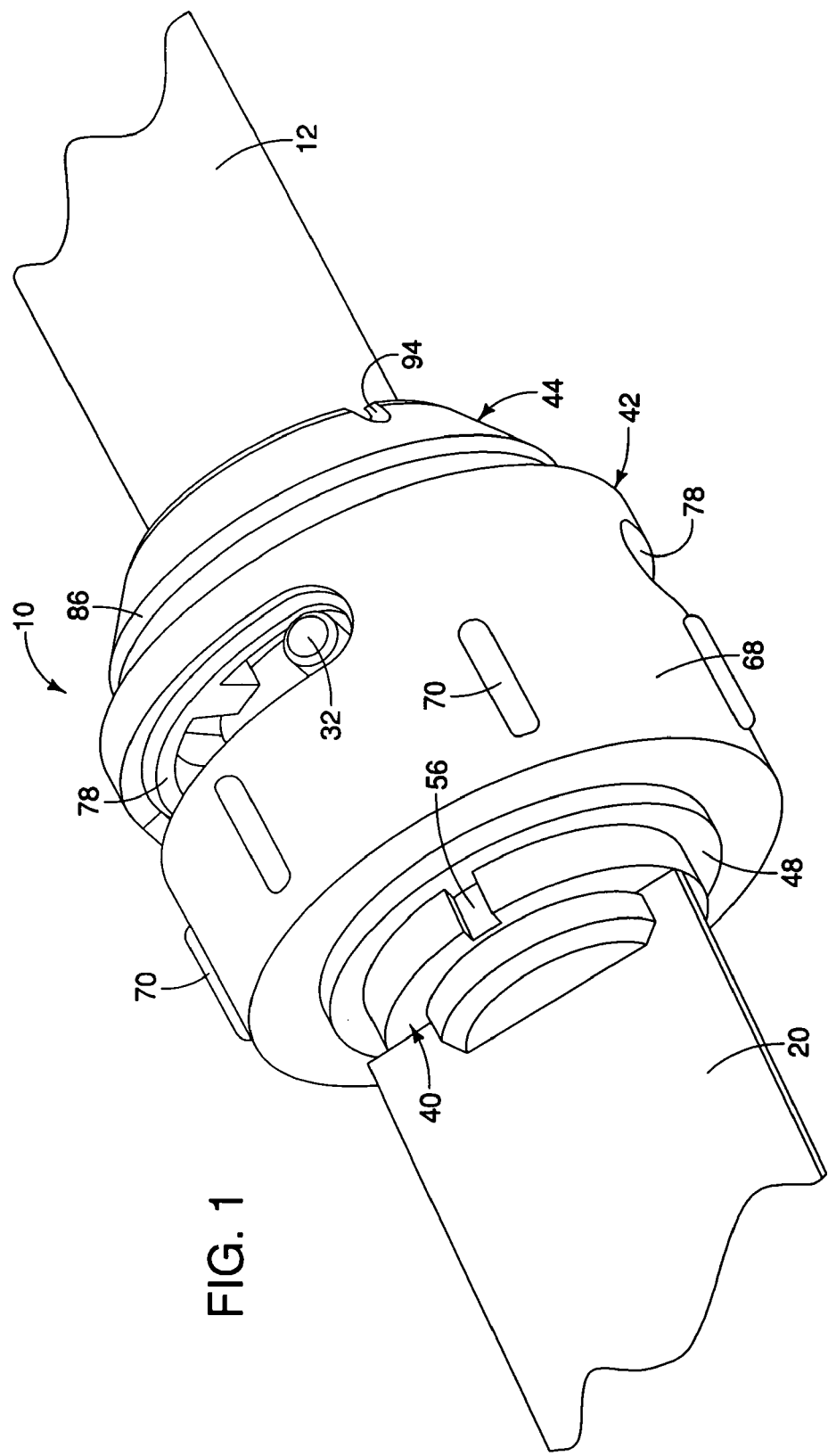
FIG. 1 is a perspective view of a preferred embodiment of the clamping apparatus shown with a blade inserted in the apparatus in its clamped position.

While embodiments of the present invention can be used with various power hand tools, jig saws, saber saws and other reciprocating saws used in the construction, demolition, metal cutting, and woodworking applications, it should be understood that the clamping apparatus is certainly susceptible for use in applications other than these. It is contemplated that the clamping apparatus may be used in the medical field, particular with surgical instruments that are used with reciprocal saw and cutting blades. Also, while the embodiments of the present invention are particularly suited for use with power hand tools, they could be used with a non-power hand tool as well as larger stationary power tools that employ tool attachments in a reciprocating manner and where such tool attachments are replaced. The detailed description of the preferred embodiments are described with regard to saber and reciprocating saws which use commercially available saw blades. The present invention should not be limited to the described applications.

The embodiments of the clamping apparatus of the present invention are particularly suited for use with a saber saw which has a generally cylindrical plunger rod or spindle, although spindles or structure may be utilized which are other than the circular cross-section. However, if it is other than a circular cross-section throughout a significant part of its length, the spindle necessarily requires a generally cylindrical distal end portion in which the embodiments of the present invention are installed. The blade described herein in which the clamping mechanism of the embodiments of the present invention are to be used is of conventional design for saber saw blades, but it should be understood that the various embodiments could be modified to operate with other styles of blades if desired.

The preferred embodiments of the present invention exhibit reliable operation and are not adversely affected by particulate contamination, such as dust from wood, plaster and drywall or metal particles that are often produced in significant quantities during use. It is also effective to retain the blade in jam situations or when scroll cutting which often applies side and twisting forces to the blade. The clean design also utilizes a small number of parts and has a relatively low weight of the assembly which is desirable in order to minimize vibrations.

Turning now to the drawings, preferred embodiments of which are shown in FIGS. 1-7, a tool-less locking mechanism is indicated generally at 10 that has a relatively few number of parts that collaborate with a reciprocating spindle or plunger that is part of a reciprocating tool such as a jigsaw or reciprocating saw that is not shown in the drawings. The spindle 12 has a preferably cylindrical shape with a slightly reduced diameter front portion 14 that forms an annular shoulder 16.

The front portion 14 has an axially oriented slot 18 that is configured to receive a blade such as blade 20. The blade 20 has a shank portion 22 that has a hole 24 which the mechanism 10 engages to retain the blade in the slot 18 of the spindle 12. The shank portion has an elongated extension 26 which is helpful to hold the blade 20 at a constant angle in the slot 18 when the mechanism is in a clamped position.

Figure 2:
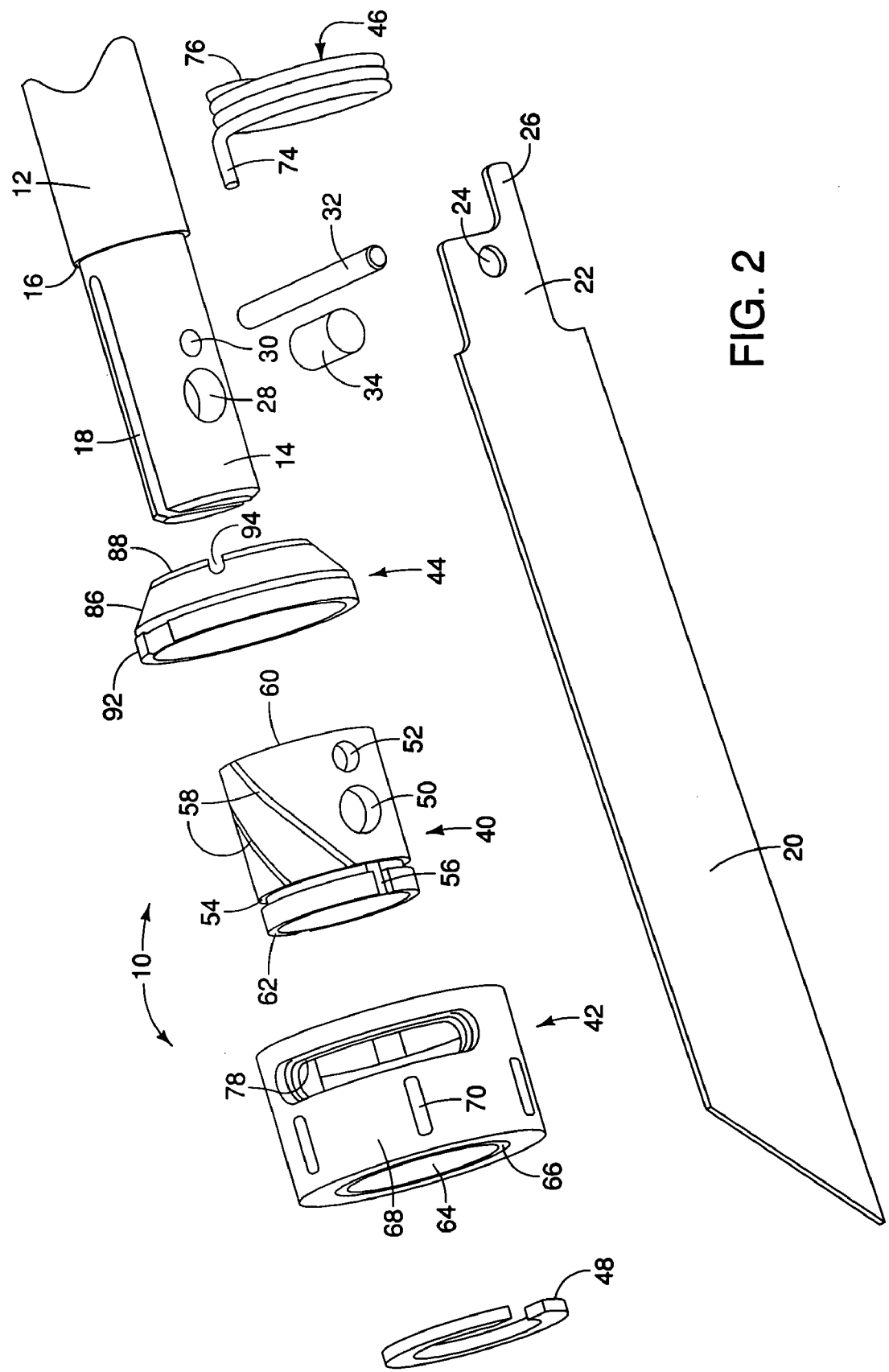
FIG. 2 is an exploded perspective illustrating the components of the apparatus shown in FIG. 1.
Figure 3:
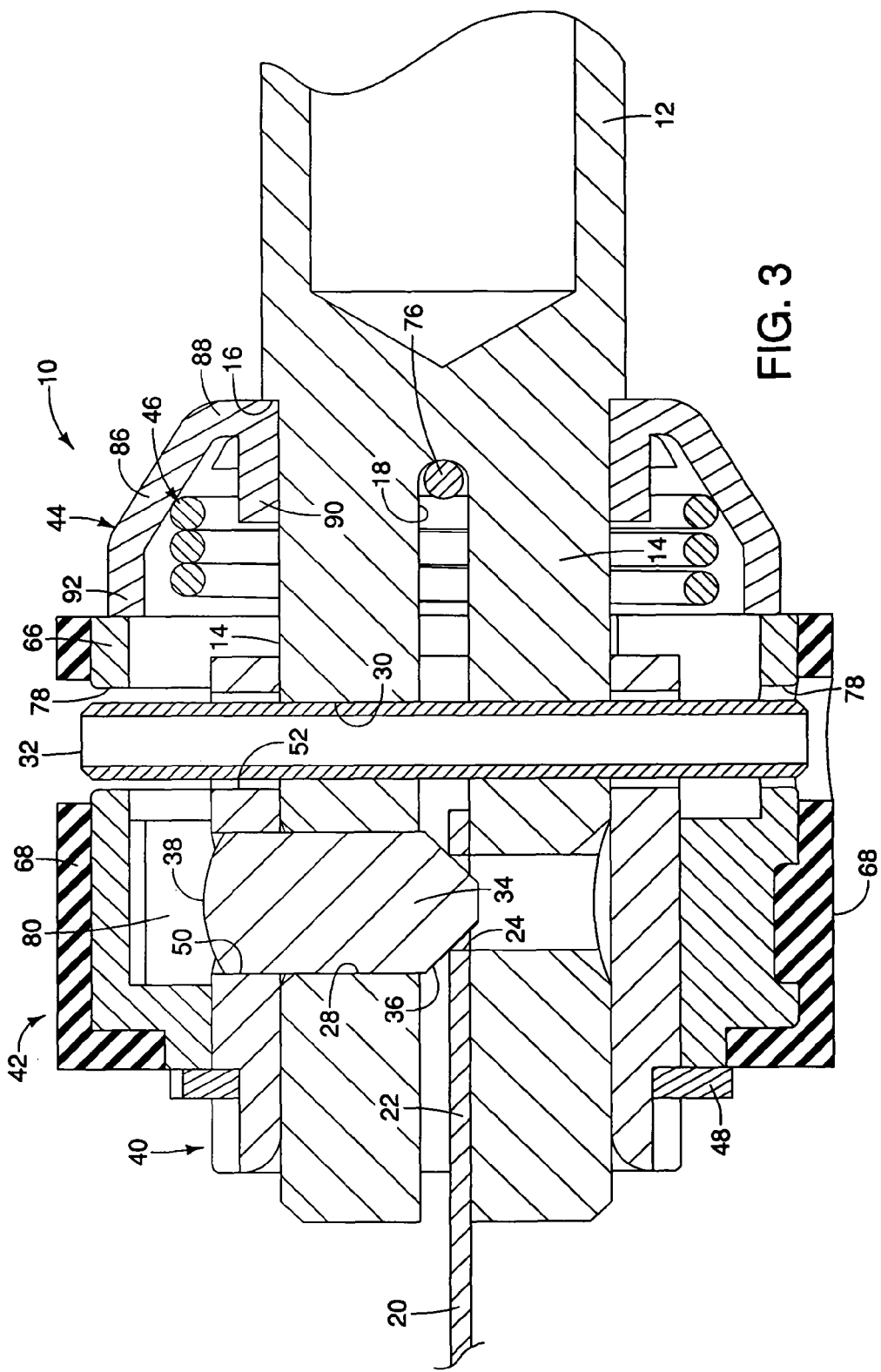
FIG. 3 is a cross-section taken generally along a line perpendicular to the orientation of the slot of the spindle at a location through the center of a detent pin.

As best shown in FIG. 2, the front portion 14 has an aperture 28 that extends from the near side of the spindle to the slot 18, and may extend completely through the entire spindle if desired. However, it is preferred that the aperture extending to the other side of the slot 18 have a reduced diameter as shown in FIG. 3 so that the a detent pin 34 cannot fall through the other side. Alternatively, the other side of the slot could merely have a recess of sufficient depth that it would securely hold the blade 20 as shown in FIG. 3. A second aperture 30 is also provided and it extends completely through the entire spindle and is sized to receive a roll or solid pin 32 that is force fit therein when the mechanism is finally assembled.

The aperture 28 is sized to receive a detent pin 34, which is slidable in the aperture 28 and has a truncated conical inner end portion 36 as best shown in FIG. 3. The detent pin 34 is sized so that the conical end portion 36 will penetrate into the aperture 24 and engage the blade 20. The opposite end of the detent pin 34 preferably has a slightly rounded surface 38.

The mechanism 10 also has a sleeve, indicated generally at 40, a rotatable collar, indicated generally at 42, a cover, indicated generally at 44, a spring, indicated generally at 46, and in some of the embodiments also a clip 48. Embodiments of the mechanism may not include the cover 44, inasmuch as it is an aesthetic component that does not perform an important operational function.

The sleeve 40 also has an aperture 50 and a second smaller aperture 52. The aperture 50 is substantially the same size as the aperture 28 of the spindle portion 14, but may be slightly larger if desired. The aperture 52 is substantially the same size as the aperture 30 in the spindle front portion 14, but it too may be slightly larger if desired. It is important that the aperture 50 be sized to enable the detent pin 34 to slide within it and the aperture 52 must be sufficiently large that the roll pin 32 may be inserted into it.

It is preferred that the inside diameter of the sleeve 40 be substantially the same size as the front portion 14 of the spindle 12 and in fact may be slightly smaller than the diameter. It is preferred that the sleeve 40 be pressed onto the front portion 14 and if it is slightly smaller than the diameter of this front portion 14, it will slightly narrow the width of the slot 18 by flexing the two sides together and thereby control the width of the blade gap or slot 18. If the size of the apertures 52 are substantially the same size as the aperture 30, then the roll pin 32 will engage the sleeve 40 on opposite sides. Since the sleeve 40 is preferably press fit on the spindle front portion 14, the extreme front edge is preferably chamfered or otherwise rounded to more easily assemble the cover as well as the sleeve 40

Certain embodiments of the sleeve 40 may include an annular recess 54 that has a width preferably slightly larger than the thickness of the clip 48 so that the clip can be installed in the recess 54. For those embodiments which do not utilize a clip 48, the recess 54 may not be present. There is a pair of axial grooves 56 located on opposite sides of the front end of the sleeve. These do not perform a function with regard to the operation of the mechanism, but are provided for manufacturing purposes to angularly orient the sleeve when it is pressed onto the spindle so that the apertures 50 and 52 are in alignment with the apertures 28 and 30 of the spindle.

The preferred embodiments of the mechanism also have a plurality of spiral grooves 58 in the outer surface of the sleeve 40. While there are four of such grooves 58 shown in the drawings, it should be understood that a greater or lesser number of grooves can be provided. It is also contemplated that the grooves may not have the spiral angle as shown, but may be at a different angle, including a 0 degree angle (parallel to the axis of the sleeve 40) or a 90 degree angle or they may intersect one another. Also, as is best shown in FIGS. 4 and 5, the spiral grooves 58 extend from the annular groove 54 rearwardly to the back end surface 60. In the event that the annular recess 54 is not present, the grooves may desirably extend from the front surface 62 to the rear surface 60 so that during operation, dust can be more effectively expelled from the front of the sleeve. The grooves can also have a width greater than that shown and may be somewhat deeper as well. It is preferred that the depth and width not be excessive relative to the thickness of the sleeve itself so as to compromise its structural rigidity and strength.

The grooves are provided to improve the reliability of operation of the mechanism in an environment that produces large amounts of dust, such as dust or particulate material and the like. When the collar 42 is rotated during insertion of the blade 20 in the slot 18, the rotating movement of the collar will move dust particles into the grooves 58. When the tool is operated, the reciprocating movement of the spindle 12 will eject the dust particles from the grooves 58 and the blade holder mechanism thereby achieves a self-cleaning capability. Such self-cleaning capability may be improved by embodiments that do not include the clip 48.

Figure 7:
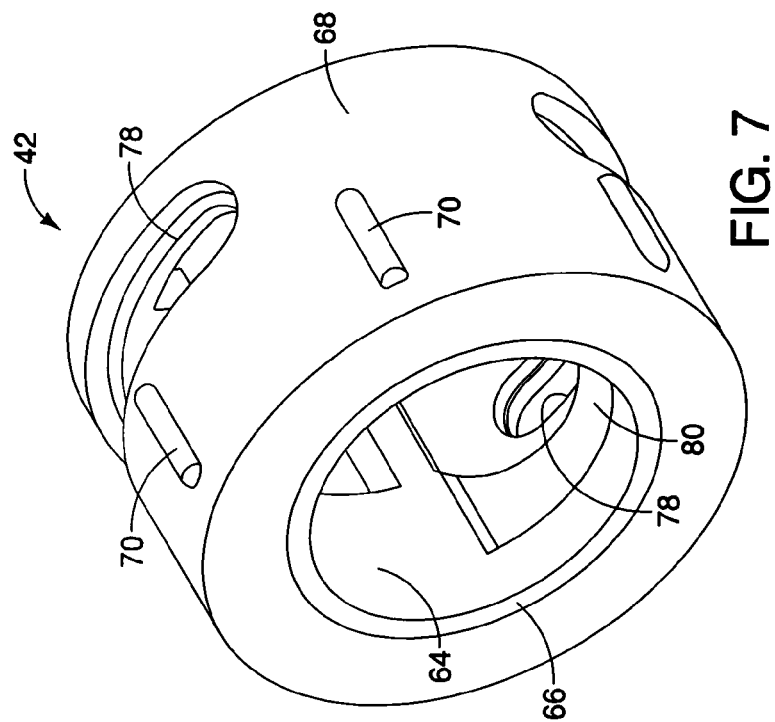
FIG. 7 is another perspective view of the collar shown in the FIGS. 1 and 6.
Figure 6:
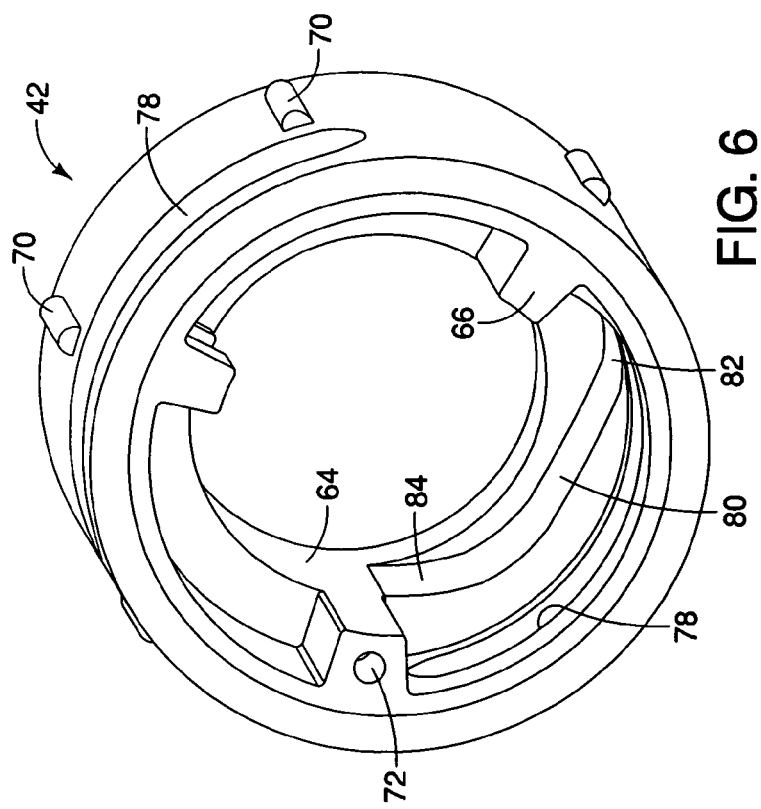
FIG. 6 is a perspective view of the collar of the apparatus shown in FIG. 1.

The collar 42, best shown in FIGS. 6 and 7 but also shown in FIGS. 1, 2 and 3, is designed and configured to fit over the sleeve 40, with an inside surface 64 being slightly larger than the outside surface of the sleeve 40. The collar 42 has an inner member 66 which is preferably made of steel or other strong material and also has an outer layer 68 that is preferably made of a resilient material such as rubber, plastic or other flexible material. The outer layer 68 has a number of raised ribs 70 that provide a gripping surface for a user. Alternatively, recesses rather than ribs may be formed in the outer layer 68.

The inner member 66 has an aperture 72 that is sized and configured to receive an axially oriented end 74 of the spring 46, an opposite end 76 of the spring being perpendicular to the end 74 and being inwardly directed relative to the coils of the spring so that it will fit within the end of the slot 18. The collar 42 is rotatable on the sleeve 40 and it has a pair of opposed slots 78 that extend through an angular arc of approximately 60-90°. These slots 78 are sized to receive respective ends of the roll pin 32. The roll pin 32 has a length so that it extends slightly beyond the inner member 66 but does not extend beyond the outer surface of the outer layer 68. The roll pin 32 that extends through the entire assembly, provides limits for the collar rotation and securely mounts the mechanism to the spindle 12.

It should be understood that the length of the slots 78 effectively limits the angle of rotation of the collar 42 relative to the sleeve 40 and effectively controls the rotation from a clamped to an unclamped position. The inner member 66 also has a cam surface 80 that gradually changes from the center axis of rotation from a maximum radius at location 82 to a minimum radius at location 84. The cam surface is axially positioned on the collar 42 so that it is positioned to contact the rounded end 38 of the detent pin 34. The fact that the roll pin 32 extends through both sides of the collar 42 provides added stability to the cam surface 80 controlling the detent pin 34.

As the collar is rotated to engage the rounded end 38 and move it into its clamped position shown in FIG. 3, the portion of the cam surface approaching the end 84 will cause it to be held so that the conical end portion 36 is inserted into the hole 24 in the blade and hold it in this position. The spring 46 is a torsion spring and it is twisted relative to the end 76 so that when the end 74 is placed in the aperture 72 a biasing force is produced which tends to move collar toward its clamped position, i.e., counterclockwise as shown in FIG. 6.

When a user wishes to insert a blade 20 into the slot 18 and have it clamped, it is necessary for the user to rotate the collar 42 in a clockwise direction as shown in FIG. 6 which will enable the blade to be pushed into the slot 18 and the shank end 22 of the blade can impinge upon the conical end portion 36 and push it away from the blade so that it can be fully inserted whereby the hole 24 is aligned with the detent pin 34. The user can then merely release the collar 42 and the spring 46 will cause the collar 42 to rotate into the clamped position where the blade will be firmly held in place.

It should be understood that the roll pin 32 effectively retains the collar 42 in place in an axial direction, even though it is free to rotate through the arc defined by the slots 78. However, in those embodiments in which additional support is desired, the clip 48 can be employed.

The illustrated mechanism also includes the cover 44 which has an outer conical shaped portion 86, an end portion 88 having an outer surface that engages the shoulder 16 of the spindle 12 and an inner portion 90 that has a diameter approximating the outside diameter of the reduced front portion 14. It is hollow inside and fits around the spring 46. The outside diameter of a front end portion 92 is slightly less than the diameter of the inner member 66 of the collar 42. The cover 44 also has a slot 94 through which the spring end can pass to enter the slot 18 of the spindle front portion 14.

In the event that the various embodiments of the present invention are installed on power tools that experience excessive forces during operation, the materials from which the present apparatus are made is preferably steel or other hard metal, with the exception that the spring retainers do not normally experience excessive stresses and therefore may be fabricated from plastic or plastic-like material.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A clamping apparatus for a reciprocating tool having a reciprocating spindle having a center axis and at least one radially oriented aperture and a receiving slot at its forward end for receiving a tool accessory that has a shank portion with a hole at one end and a working portion, the shank being configured to be inserted in the slot, the apparatus being configured to be attached to the spindle, said apparatus having an unclamped position and a clamped position, and comprising:
    a hollow generally cylindrical sleeve secured to the spindle, said sleeve having a radial aperture aligned with the spindle aperture;
    a hollow generally cylindrical collar configured to fit on said sleeve and being rotatable relative to the spindle and said sleeve, said collar having an inner cam surface that increases in radius from the axis through a first predetermined circumferential arc in a first direction;
    a spring operatively connected to provide a biasing force to said collar in a second direction opposite said first direction; and
    a detent pin positioned in the spindle aperture and configured to engage the hole in the tool accessory and thereby firmly hold the tool accessory in said apparatus when urged into contact with the tool accessory;
    said collar being biased by said spring to rotate said collar to its clamped position when the tool accessory is inserted in said slot, the rotation causing said cam surface to engage said detent pin and move it into the hole in the tool accessory and firmly hold the tool accessory in the apparatus,
    wherein said cylindrical sleeve has a plurality of grooves formed on an outer surface thereof and extending at an angle from the rear end forwardly, for collecting and expelling particulate material that may accumulate between said sleeve and said collar during an operation of the reciprocating tool.

2. A clamping apparatus as defined in claim 1 wherein said sleeve further comprising an annular recess oriented in a plane perpendicular to the center axis and extending around a substantial portion of the outside surface near the forward end.

3. A clamping apparatus as defined in claim 1 wherein said spring is a torsion spring having one end restrained by the spindle and its opposite end operatively connected to said collar.

4. A clamping apparatus as defined in claim 1 wherein the spindle has a second radially oriented aperture and said sleeve has a second radially oriented aperture aligned with the second spindle aperture, said apparatus further comprising an elongated pin that is inserted in said second apertures for securing said sleeve to the spindle.

5. A clamping apparatus as defined in claim 1 wherein said spring is located rearwardly of said collar, said apparatus further comprising a cover mounted on the spindle adjacent said collar and configured to enclose said spring.

6. A clamping apparatus as defined in claim 5 wherein the spindle has a shoulder adjacent said cover configured to restrain movement thereof in a rearward direction.

7. A clamping apparatus as defined in claim 6 wherein said cover has an inside diameter slightly larger than the portion of the plunger forward of said shoulder and a conical outer surface the diameter of which increases in the forward direction and approximates the outer diameter of said collar at its forward end.

8. A clamping apparatus as defined in claim 7 wherein said cover is comprised of a plastic material.

9. A clamping apparatus as defined in claim 2 further comprising a narrow cylindrically shaped open flexible clip located in said annular recess and abutting the forward end of said collar for retaining said collar on said sleeve.

10. A clamping apparatus as defined in claim 4 wherein said collar comprises at least one annular elongated slot that extends through a predetermined angular arc, and said pin has at least one end that extends beyond the outer surface of said sleeve into said slot, the ends of said slot limiting the angular rotation of said collar on said sleeve.

11. A clamping apparatus as defined in claim 9 wherein said clip is a C shaped clip.

12. A clamping apparatus as defined in claim 10 wherein said angular arc is within the range of about 60 degrees to about 90 degrees.

13. A clamping apparatus as defined in claim 10 wherein said collar comprises a second annular elongated slot that extends through said predetermined angular arc, and said pin has an opposite end that extends beyond the outer surface of said sleeve into said second slot.

14. A clamping apparatus as defined in claim 1 wherein the tool accessory is an elongated flat blade.

15. A clamping apparatus as defined in claim 1 wherein said collar further comprises an outer layer of rubber or rubber-like material.

16. A clamping apparatus as defined in claim 15 wherein said outer layer further comprises a plurality of generally axially oriented raised ribs.

17. A clamping apparatus as defined in claim 2 wherein said plurality of spiral grooves extend from the rear end to said annular recess.

18. A clamping apparatus as defined in claim 1 wherein said detent is cylindrically shaped with a truncated conical end portion, the diameter of said cylindrical detent being larger than the size of the hole in the shank portion of the tool accessory.

19. A clamping apparatus for a reciprocating tool having a reciprocating spindle having a center axis and first and second radially oriented apertures and a receiving slot at its forward end for receiving a blade tool that has a shank portion at one end with a hole and a working blade portion, the shank being configured to be inserted in the slot, the apparatus being configured to be attached to the spindle, said apparatus having an unclamped position and a clamped position, and comprising:

a hollow generally cylindrical sleeve secured to the spindle, said sleeve having a first radially oriented aperture aligned with the first spindle aperture, a second radially orient aperture adjacent said first aperture;

an elongated pin inserted in said second apertures of the spindle and said sleeve for securing said collar to the spindle;

a hollow generally cylindrical collar configured to fit on said sleeve and being rotatable relative to the spindle and said sleeve, said collar having an inner cam surface that increases in radius from the axis through a first predetermined circumferential arc in a direction toward an unclamped position, said collar having at least one annular elongated slot that extends through a predetermined angular arc, and said pin has at least one end that extends beyond the outer surface of said sleeve into said slot, the ends of said slot limiting the angular rotation of said collar on said sleeve;

a torsion spring having one end restrained by the spindle and an opposite end operatively connected to said collar and imparting a force biasing said collar toward its clamped position;

a detent pin positioned in the first spindle aperture and configured to engage the hole in the blade and thereby firmly hold the blade tool in said apparatus when urged into contact with the blade tool;

said collar being biased by said torsion spring to rotate said collar to its clamped position when the blade shank is inserted in said slot, the rotation causing said cam surface to engage said detent pin and move it into the hole in the blade shank and firmly hold the blade tool in the apparatus, wherein said cylindrical sleeve has a plurality of grooves formed on an outer surface thereof and extending at an angle from the rear end forwardly, for collecting and expelling particulate material that may accumulate between said sleeve and said collar during an operation of the reciprocating tool.

20. A clamping apparatus as defined in claim 19 further comprising an annular recess oriented in a plane perpendicular to the center axis and extending around a substantial portion of the outside surface near the forward end.

21. A clamping apparatus as defined in claim 20 further comprising a narrow cylindrically shaped open flexible clip located in said annular recess and abutting the forward end of said collar for retaining said collar on said sleeve.

* * * * *